United States Patent [19]

Denk

[11] Patent Number: 5,233,252
[45] Date of Patent: Aug. 3, 1993

[54] MOTOR HAVING INTEGRAL DETENT

[75] Inventor: Joseph Denk, Manhattan Beach, Calif.

[73] Assignee: AlliedSignal, Morris Township, Morris County, N.J.

[21] Appl. No.: 628,273

[22] Filed: Dec. 14, 1990

Related U.S. Application Data

[60] Continuation-in-part of Ser. No. 345,312, Apr. 26, 1989, abandoned, and Ser. No. 383,395, Jul. 20, 1989, abandoned, which is a continuation-in-part of Ser. No. 107,150, Oct. 9, 1987, Pat. No. 4,852,245, which is a division of Ser. No. 800,184, Nov. 20, 1985, Pat. No. 4,709,180.

[51] Int. Cl.⁵ .............................................. H02K 1/12
[52] U.S. Cl. ...................................... 310/254; 310/66; 310/103; 310/156; 310/180; 29/596; 244/75 R; 244/228
[58] Field of Search ............... 30/104, 165, 42, 43, 30/93, 45, 156, 179, 216, 254, 258, 259, 66, 89, 23, 180, 181, 215, 68 R, 103, 106, 105, 107, 109; 29/596; 244/228, 75 R

[56] References Cited

U.S. PATENT DOCUMENTS

| Re. 31,950 | 7/1985 | Binns ...................... 310/165 |
|---|---|---|
| 3,890,515 | 6/1975 | Fehr ....................... 310/104 |
| 4,099,104 | 7/1978 | Muller ..................... 318/254 |
| 4,130,769 | 12/1978 | Karube ................... 310/156 |
| 4,358,692 | 11/1982 | Hallerback ............ 310/258 U X |
| 4,401,906 | 8/1983 | Isobe ..................... 310/156 |
| 4,429,263 | 1/1984 | Müller ................. 310/254 U X |
| 4,463,715 | 8/1984 | Brammer ................ 310/70 R |
| 4,486,506 | 12/1984 | Kenjo ..................... 310/215 |
| 4,501,983 | 2/1985 | Schmider ................ 310/89 |
| 4,532,448 | 7/1985 | Welburn ............ 310/254 U X |
| 4,667,123 | 5/1987 | Denk et al. . |
| 4,709,180 | 11/1987 | Denk . |
| 4,720,640 | 1/1988 | Anderson ........... 310/254 U X |
| 4,852,245 | 8/1989 | Denk . |
| 4,971,267 | 11/1990 | Fulton .................... 74/665 G |

Primary Examiner—R. Skudy
Attorney, Agent, or Firm—David B. Abel; Hugh P. Gortler; Robert A. Walsh

[57] ABSTRACT

The motor provided includes a unique laminated stator core and a means for changing the continuity of the magnetic circuit. The stator core structure is split into two part-cylindrical elements which define spaces between their opposing ends. Flux gates fill the spaces and provide magnetic circuit continuity. The flux gates are connected to solenoids which can displace the flux gates in and out of the spaces, thereby changing the continuity of the magnetic circuit of the motor. The motor rotor aligns its magnetic axis with the spaces, and will resist substantial imposed torque loads.

14 Claims, 6 Drawing Sheets

RADIAL MAGNETIC AIR GAP

MOTOR HAVING INTEGRAL DETENT

This application is a continuation-in-part of two U.S. patent applications: Ser. No. 383,395 now abandoned, a continuation-in-part of Ser. No. 107,150 now U.S. Pat. No. 4,852,245 a division of Ser. No. 800,184, filed Nov. 20, 1985, now U.S. Pat. No. 4,709,180; and Ser. No. 345,312 filed Apr. 26, 1989.

BACKGROUND OF THE INVENTION

The present invention relates generally to the construction, configuration, and use of an electrical machine comprising a motor having an integral detent or magnetic brake. The motor is particularly adapted for use within an actuation system for driving a leading edge flap of an aircraft airfoil which requires periodic holding against substantial back-driving forces on the flap.

Electrically driven primary flight control surfaces such as leading edge flaps require a detent or brake to hold motor position against aerodynamic loads during flight which tend to back-drive the actuation system. Previous designs have used motor stall current to provide the brake function. However, this requires continuous energization of one motor winding resulting in unacceptable thermal stress. The thermal stresses and the continuous energization of a winding combine to substantially reduce the reliability of the motor. In addition, for dual electric motor driven actuation systems, an additional friction type brake is required to provide a reaction point for single motor operation. Present state of the art systems utilize solenoid operated friction type brakes that are physically large and subject to wear, requiring periodic maintenance and replacement.

Because primary flight control surfaces, such as leading edge flap drives, are required to be highly reliable, designers have generally used hydraulic motor drive systems instead of electric motor drive systems. However, hydraulic systems in aircraft have their own set of limitations and reliability problems. Accordingly, it is desirable to have a highly reliable electric motor drive system as an alternative to hydraulic systems.

In U.S. Pat. No. 4,852,245, a parent application to the present invention, Applicant details a high reliability, high power density toothless stator motor which is relatively inexpensive to produce and which eliminates the usual "T" shaped ferromagnetic stator core teeth. The copper windings are installed in slot areas between adjacent radially outwardly extending support fins of a plastic cylindrical winding support structure. The support fins and the winding support structure do not carry magnetic flux and are relatively thin, thereby the slot area in which the stator windings are installed is maximized. The stator windings may be pre-wound on a form and easily dropped into the slots between the support fins. A laminated cylindrical flux core surrounds the stator windings and support structure to provide a magnetic flux return path for the rotor.

High energy product permanent magnets having significant energy product increases over previously known permanent magnets allow the construction of a high strength permanent magnet rotor for use with the above described toothless stator motor. For example, samarium cobalt permanent magnets having an energy product of thirty mega-gauss-oersted (MGO), or neodymium-iron-boron magnets which have an energy product of thirty-five MGO are now available. A rotor making the maximum use of high energy product permanent magnets is disclosed in Applicant's U.S. Pat. No. 4,667,123 issued May 19, 1987. The use of such high energy product permanent magnets permits reliable electric machines to be built which are capable of supplying high power outputs.

While the above references detail an electric motor which has the requisite power and reliability for use in a primary flight surface drive actuation system, the brake problem remained a limiting factor. Accordingly, a high power density electric motor which includes a highly reliable brake is very desirable.

SUMMARY OF THE INVENTION

The preferred embodiment of the present invention contemplates using a two pole permanent magnet rotor and a toothless stator motor as detailed in the applications summarized above. In addition, the motor includes a unique laminated stator core and a means for changing the continuity of the magnetic circuit defined primarily by the laminated stator core and two pole permanent magnet. The laminated stator core structure is preferably split into two part-cylindrical elements, with each lamination now being generally a part-circular plate. When assembled about the stator windings, the part-cylindrical elements are designed to have spaces between the opposing ends. A pair of flux gates are configured to fill the between the part-cylindrical elements, and to provide magnetic circuit continuity therebetween. Accordingly, the spaces and matching flux gates can have a number of different configurations. The flux gates are preferably connected to solenoid devices which can displace the flux gates in and out of the spaces, thereby changing the continuity of the magnetic circuit of the motor. During motor operation, the solenoids insert the flux gates into the spaces. When the motor is not in use and the detent mode is required, the solenoids are turned off and springs pull the flux gates out of the spaces. The permanent magnet rotor will then rotate to align its magnetic axis with the spaces. Once in alignment, the magnetic circuit surrounding the rotor is in a preferred orientation and will resist substantial imposed torque loads.

A pair of motors according to this design are incorporated in an actuation system for a primary flight control surface as drive motors. The resulting system replaces the existing hydraulic or electric motor and potentially eliminates the need for an additional friction brake. The motors drive a plurality of geared actuators via interconnecting shafts. The actuators in turn drive the flight control surface.

DETAILED DESCRIPTION OF THE PREFERRED EMBODIMENT

Figure 1:
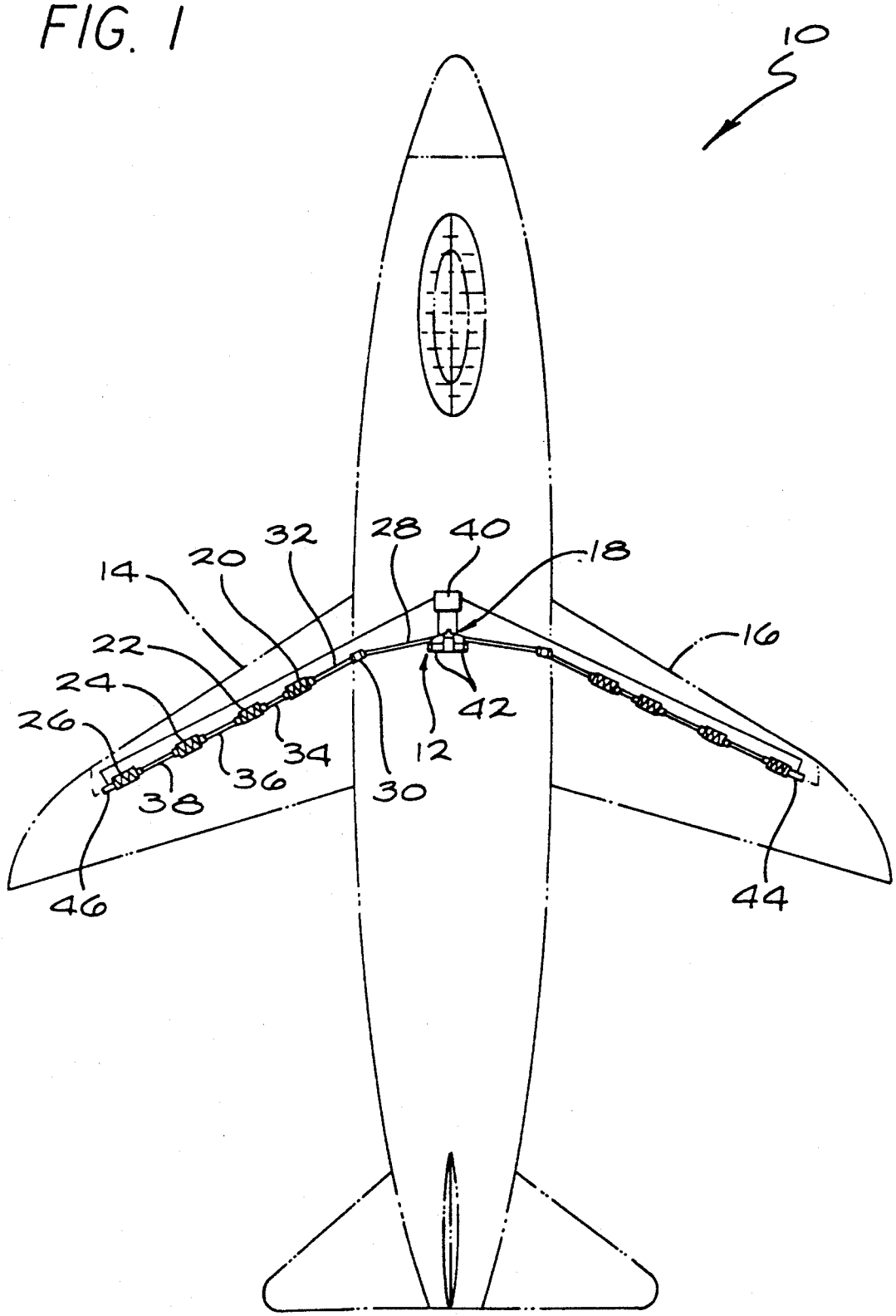
FIG. 1 shows a schematic representation of an aircraft including a leading edge flap drive system.

FIG. 1 shows a schematic representation of an aircraft 10 including an actuation system 12 to drive a pair of leading edge flaps 14, 16. The actuation system 12 includes a power drive unit 18 which drives first, second, third and fourth actuators 20, 22, 24, and 26, each individually attached to the leading edge flap 14. A pair of inboard torque shafts 28 extend from the power drive unit 18 to angle gearboxes 30 at their outboard end. The angle gear boxes 30 are in turn connected to fusible shafts 32 which extend out to the first actuators 20. First, second, and third shafts 34, 36, and 38 interconnect the first actuators 20 with the second actuators 22, the second actuator 22 with the third actuators 24, and the third actuators 24 with the fourth actuators 26, respectively. The actuation system 12 also includes an electronic controller 40, which is connected to the power drive unit 18, a pair of rotational position transducers 42 on each side of the power drive unit 18, as well as rotational position transducers 44 and 46 located at the outboard end of fourth actuators 26.

In operation, a command from the aircraft pilot is sent to the electronic controller 40 which directs the power drive unit 18 to rotationally drive the torque shafts at a relatively high rotational speed. The actuators 20, 22, 24 and 26 include torque multiplying, speed reducing features which substantially reduce the rotational output to the flaps 14, 16, on the order of between from 300:1, to 3000:1. Thus, in order to move the flaps 14, 16 through an angle of ten degrees, the shafts would rotate approximately seventy times for an actuator reduction ratio of 2500:1. In order to prevent severe damage to the aircraft 10, the electronic controller 40 receives position signals from transducers 42 on the power drive unit 18 and from the transducers 44 and 46 on the fourth actuators 26. The electronic controller 40 compares these signals to determine whether the actuators are being properly driven by the power drive unit 18. In the event that the signals do not match, the electronic controller 40 activates a brake within the fourth actuators 26, locking the position of the actuators 26. The electronic controller 40 also simultaneously shuts off power to the power drive unit 18, thus effectively shutting down the actuation system 12. During the period of the flight when the flaps 14, 16 are not being rotationally driven, the motors 50 of power drive unit 18 (viewing FIG. 2) go into a detent or holding mode, essentially acting as a brake to resist back-driving forces exerted on the flaps 14, 16. This detent mode is described more thoroughly below with respect to the detailed design of the motors 50.

Figure 2:
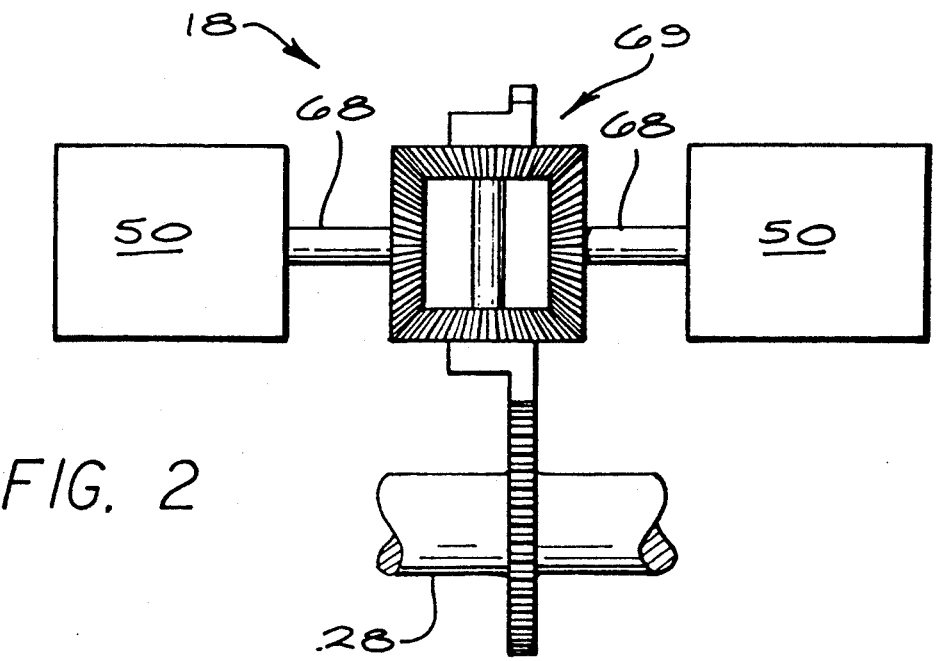
FIG. 2 is a schematic view of the power drive assembly of FIG. 1.
Figure 3:
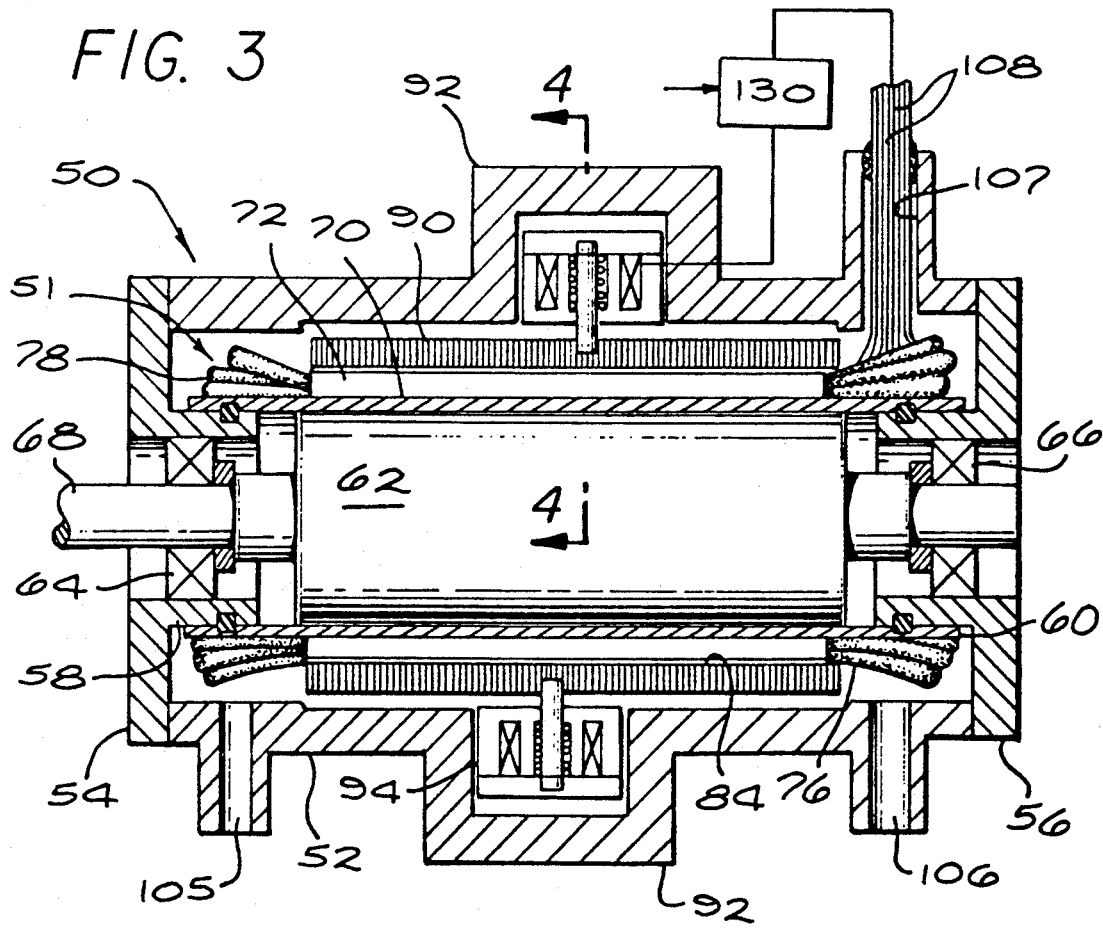
FIG. 3 is a partial cross-sectional view of one of the motors of FIG. 2.
Figure 4:
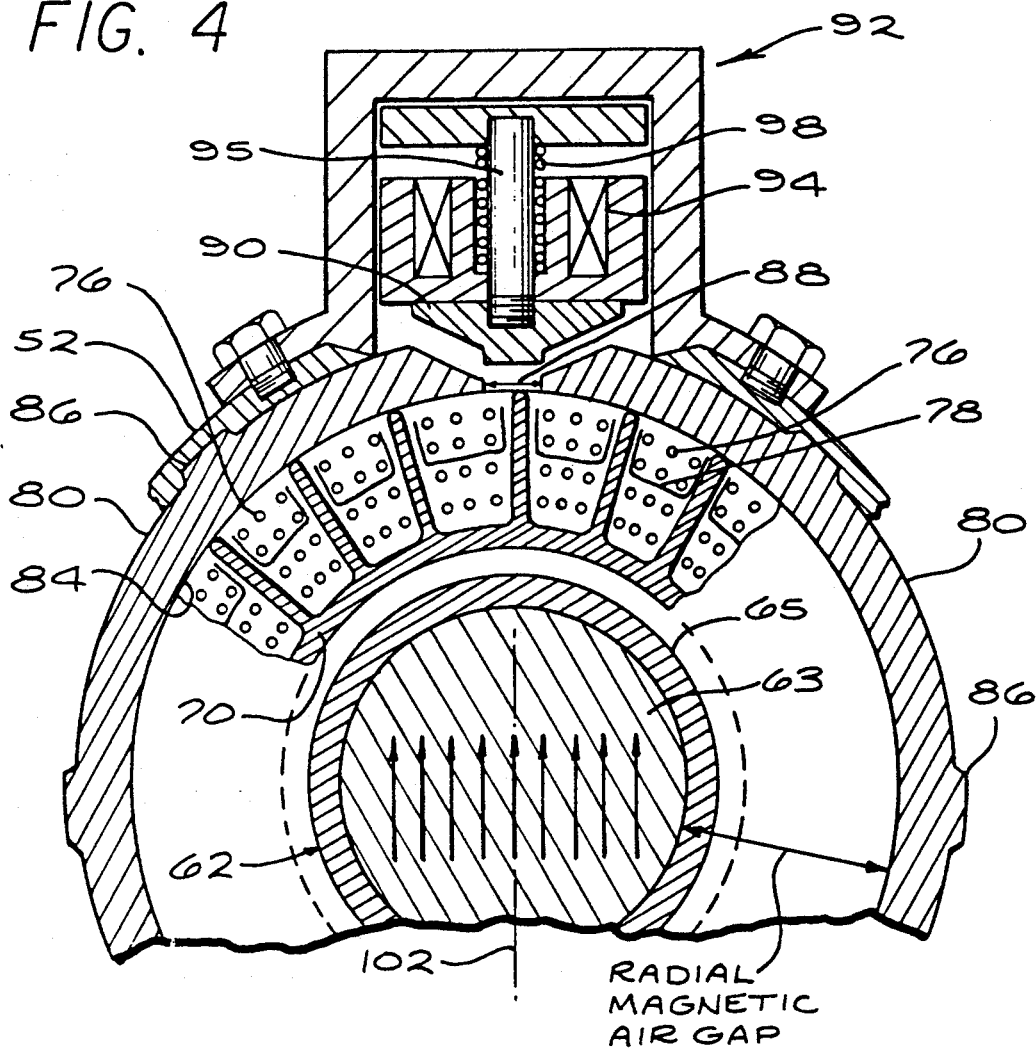
FIG. 4 is a partial cross-sectional view taken along line 4—4 of FIG. 3 and depicting the solenoid and flux gates in an open position.
Figure 5:
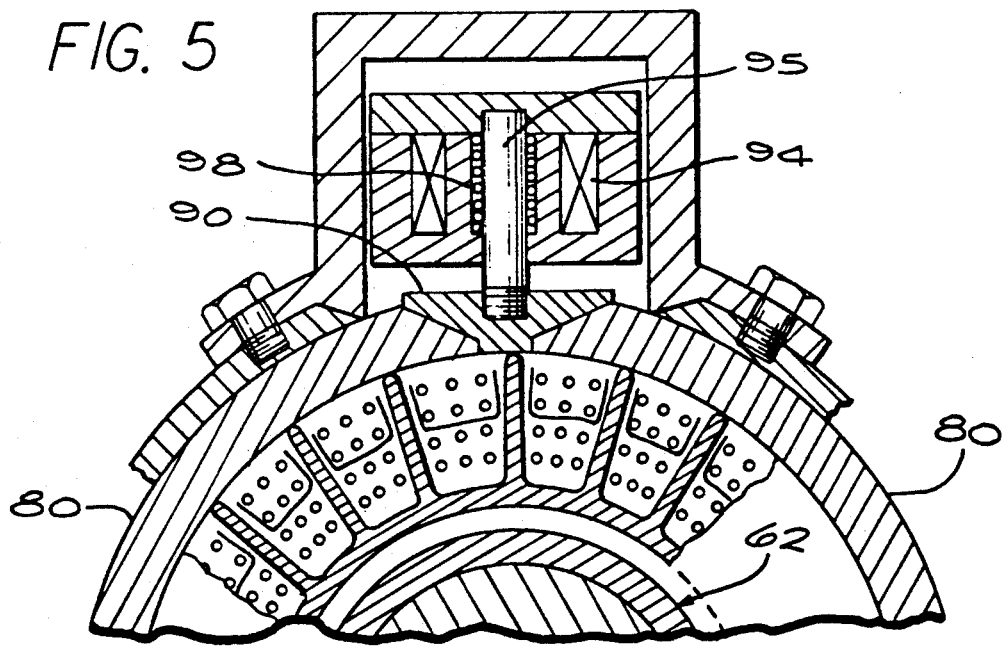
FIG. 5 is a partial cross-sectional view similar to FIG. 4 depicting the flux gate in the closed position.

The power drive unit 18 of FIG. 1 includes the pair of electric motors 50 illustrated schematically in FIG. 2 and in detailed cross section in FIGS. 3-5. Each electric motor 50 has a housing 52, which is essentially cylindrical, and has two end bells 54, 56, each of which includes smaller concentric cylindrical bearing support areas 58, 60, respectively, located in their centers. The assembly consisting of the housing 52 and the end bells 54, 56 is sealed. A permanent magnet rotor 62, preferably comprising a solid cylinder permanent magnet 63 (referring to the axial, cross sectional view of FIG. 4) contained in a retaining sleeve 65 of high strength, non-magnetic material, is attached to a shaft 68 supported within the housing 52 on bearings 64, 66, mounted in the cylindrical bearing support areas 58, 60. The output via shafts 68 is coupled through a differential 69 (FIG. 2) to drive the inboard torque shafts 28 of the actuation system 12.

The motors 50 preferably include a toothless stator 51 having a winding support structure 70 which is essentially cylindrical with a plurality of longitudinally extending support fins 72 extending radially outwardly from the cylindrical portion, with slot areas located between adjacent support fins 72. The number of slot areas may vary as in conventional stators. The winding support structure 70 is made of non-magnetizable material, for example a high temperature engineering plastic such as polyamide-imide, with the support fins 72 and the cylindrical portion of the winding support structure manufactured integrally.

It may be noted from FIG. 3 that the support fins 72 are longitudinally mounted on the cylindrical portion of the winding support structure 70 intermediate the two ends, with portions at both ends of the cylindrical portion of the winding support structure 70 not carrying the support fins 72. Hence, the cylindrical portion of the winding support structure 70 is somewhat longer than the support fins 72, and extends from the support fins at both ends of the winding support structure 70. The ends of the winding support structure 70 not carrying the support fins 72 are where the interconnections between the portions of the stator windings 76 lying in the slot areas between the support fins 72 are made and where the lead wires are carried. The stator windings 76 may be prefabricated on forms, and then laid into the slot areas between the support fins 72 on the winding support structure 70. The stator windings 76 will typically include two conductors installed into each slot area separated by insulating strips 78, each of which conductors having multiple turns.

FIG. 4 depicts the stator windings 76 wound and mounted in the slot areas around the winding support structure 70, and a pair of stator core elements 80 made of magnetizable material such as laminated electrical steel, installed at the periphery of the winding support structure containing the stator windings 76. Since the stator core elements 80 are made of magnetizable material which is typically conductive, an insulating liner 84 is installed between the inner diameter of the stator core elements 80 and the outer diameter of the winding support structure 70 carrying the stator windings 76. The only insulators necessary in the toothless stator 51 are the insulating strips 78 and the insulating liner 84. The stator windings 76 need not be impregnated with varnish, and therefore may easily be cooled by air or coolant flowing through the stator 51.

The stator core elements 80 are preferably a pair of generally part-cylindrical members made up of a plurality of interbonded laminations. Each lamination may include raised portions 86 arranged around its outer periphery. The raised portions 86 function to support the stator core elements 80 inside the housing 52 while allowing cooling flow between the stator core elements 80 and the housing 52. Note that in smaller machines, ferrite elements may be substituted for the laminated construction of the stator core elements 80.

As shown in FIG. 4, the stator core elements 80 are designed to have spaces 88 between the opposing ends. A pair of flux gates 90 are oppositely disposed on the motor 50 (FIG. 3) and configured to be inserted into the spaces 88 between the part-cylindrical stator core elements 80, and thereby provide magnetic circuit continuity between the stator core elements 80. The flux gates 90 of FIGS. 3-5 are elongated, generally "V" shaped bars made from a plurality of interbonded laminated sheets of electrical steel. The flux gates 90 are preferably connected to actuating means for displacing the flux gates such as solenoids 92, which can displace the flux gates 90 in and out of the spaces 88, thereby changing the continuity of the magnetic circuit of the motor 50.

During motor operation, coils 94 of the solenoids 92 are energized to drive a plunger 95 attached to the flux gate 90, inserting the flux gates 90 into the spaces 88. Once inserted and during motor operation, the magnetic circuit surrounding the permanent magnet rotor 62 will tend to retain the flux gates 90 between the stator core elements 80 to preserve magnetic circuit continuity. When the motor 50 is not in use to provide a driving output, the detent or brake mode is engaged when springs 98, associated with the solenoids 92, pull up on the plunger 95 and withdraw the flux gates 90 from the spaces 88. The permanent magnet rotor 62 will simultaneously rotate to align its magnetic axis 102 with the spaces 88. Once aligned, the magnetic circuit surrounding the permanent magnet rotor 62 is in a preferred orientation and will resist imposed torque loads.

The assembled stator core elements 80, flux gates 90 and solenoids 92 are installed over the winding support structure 70 carrying the stator windings 76 with the insulating liner 84 therebetween, and the resulting assembly is mounted inside the housing 52. The inner diameter of the ends of the cylindrical portion of the winding support structure 70 are mounted in interference fit fashion around the outer diameter of the cylindrical bearing support areas 58, 60 at the ends of the housing 52. A chamber is formed between the interior of the housing 52 and the outer surfaces of the winding support structure 70 through which air or coolant may be circulated.

The housing 52 may also include an inlet channel 105 at one end of the housing 52, and an outlet channel 106 at the other end of the housing 52. It may therefore be appreciated that a cooling fluid may be circulated through the housing 52 through the inlet channel 105, through the stator windings 76 and around the stator core elements 80, and out of the housing 52 through the outlet channel 106 to cool the stator assembly of the electric motors 50. An additional aperture 107 in the housing 52 is used to bring the winding leads 108 from the stator windings 76 through the housing 52, which aperture 107 is otherwise sealed. While generally not required for flap drive motors, active cooling may benefit other uses for the motor 50 of the present invention.

Within the motor 50, the stator core elements 80 extend a majority of the arcuate distance between opposite magnetic poles of the permanent magnet rotor 62. The spaces between the facing edges of the stator core elements 80 define the magnetic spaces 88. The width of the spaces 88 is one of the factors which determines the maximum torque resisting force in the detent mode for the motor 50, and may be designed to be in the range of from slightly greater than zero degrees up to thirty degrees in arcuate length. Preferably the width of the spaces 88 is approximately equal to the radial air gap distance between the outer diameter of the permanent magnet rotor 62 and the inner diameter of the stator core elements 80, to maximize the pull out torque for the brake or detent position. The exact cross sectional shape of the spaces 88 will depend upon the shape of the flux gate 90 which is designed to fit into the spaces 88 as tightly as possible, and to complete a perfect hollow cylinder with the stator core elements 80.

In the detent mode, the motor 50 develops torque between the stator core elements 80 and permanent magnet rotor 62 due to the substantial change in reluctance of the magnetic circuit when the magnetic axis of the permanent magnet rotor 62 is angularly displaced from the centerline of the spaces 88. The torque increases to a maximum value when the permanent magnet rotor 62 is rotated approximately forty-five degrees from the centerline of space 88 of the stator 51. The torque then decreases, reaching an unstable zero level at ninety degrees of relative rotation. The magnetic detent provides a new method to produce holding torque without wearing parts and requires no power input in the static operating modes. Normal motor design and operation is not significantly affected by the installation of the movable flux gates 90 and the activating solenoids 92.

Figure 6:
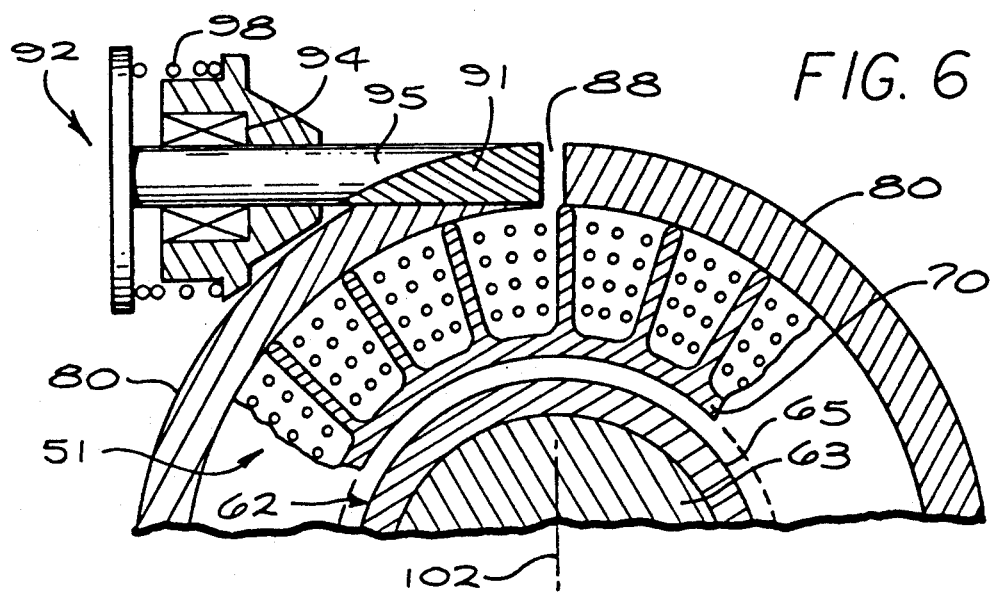
FIG. 6 is a first alterative embodiment for the flux gate and solenoid actuation depicting the flux gate in the open position.
Figure 6A:
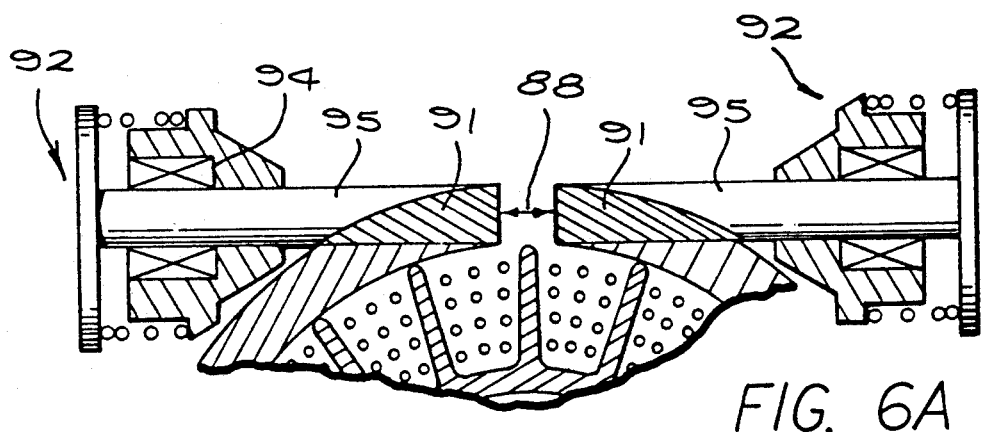
FIG. 6A is a fragmentary cross sectional view similar to FIG. 6, but showing a flux gate having paired oppositely-acting solenoid actuators in the open-gate position.
Figure 7:
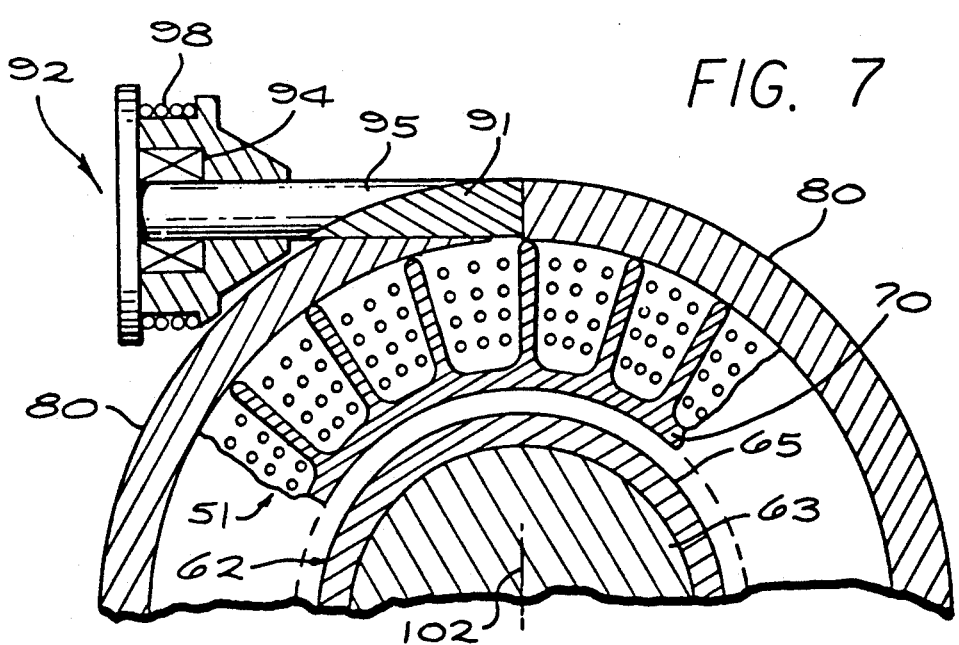
FIG. 7 is a partial cross-sectional view similar to FIG. 6 depicting the alterative flux gate arrangement in the closed position.

FIGS. 6 and 7 depict an alternative embodiment incorporating sliding flux gates 91 and solenoids 92 for use in the invention. In this configuration, the sliding flux gates 91 move tangentially with respect to the stator 51. The sliding flux gates 91 have a shape approximating an elongated bar having right-triangle cross sections with the long side being curvilinear and preferably having a radius of curvature equal to the radius of curvature of the outer diameter of the stator core elements 80. FIG. 6 depicts the sliding flux gate 91 as being in the open position thereby producing a magnetic space 88 between the opposite ends of the stator core elements 80. As in FIGS. 4 and 5, the solenoid 92 includes a plunger 95 attached to the sliding flux gate 91, to withdraw the sliding flux gate 91 to define the space 88, while a spring 98 returns the sliding flux gate 91 to the closed position for motor operation, as shown in FIG. 7. It may be appreciated that while one solenoid 92 and sliding flux gate 91 may be sufficient to open and close the magnetic spaces 88, it may be preferable to have opposing solenoids 92 and two opposing sliding flux gates 91 as depicted in FIG. 6A to thereby provide continuity within the magnetic circuit during motor operation, and also to optimize the space geometry during the break or detent mode of operation.

Figure 8:
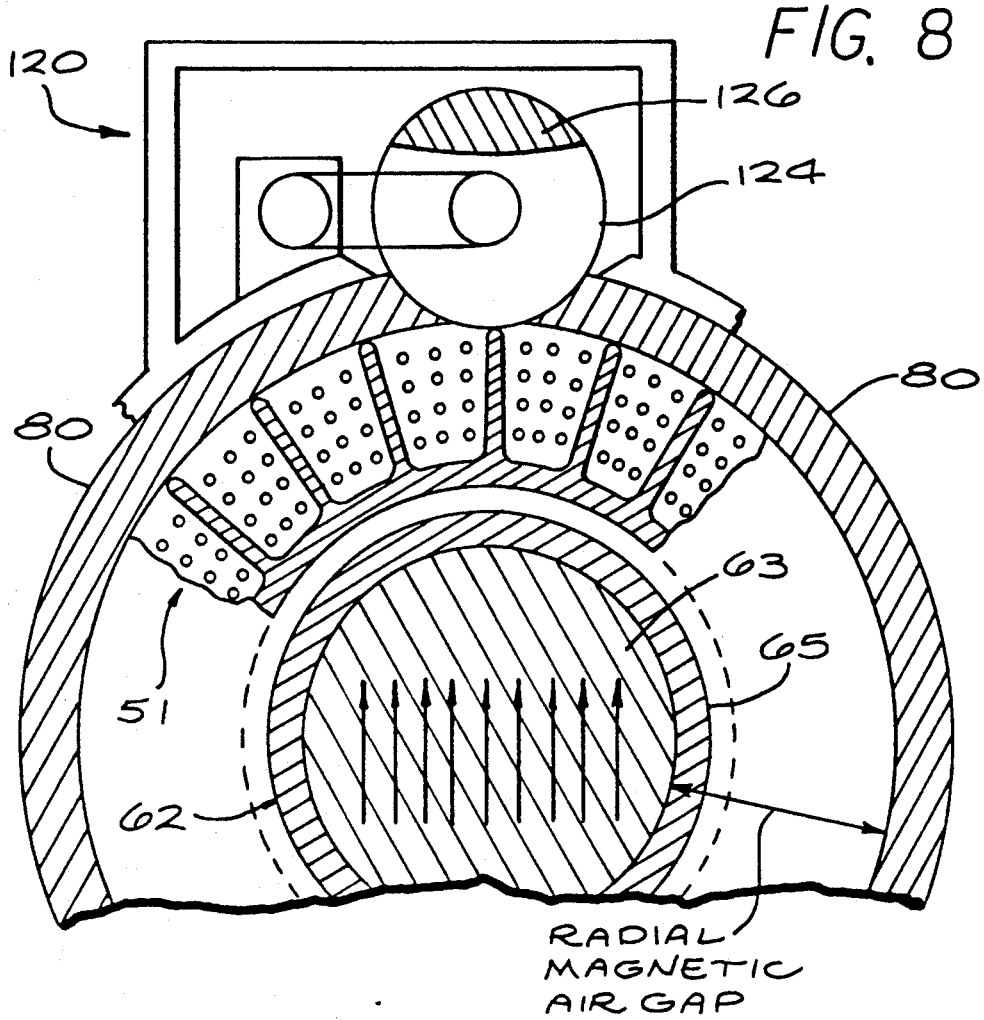
FIG. 8 is a second alterative embodiment shown in partial cross-sectional view with the flux gate in the open position.
Figure 9:
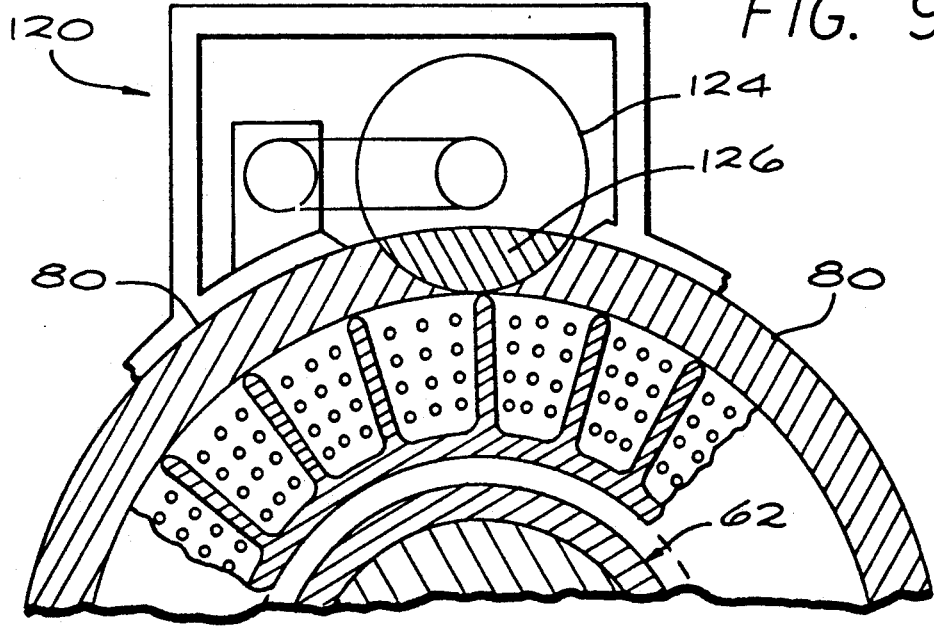
FIG. 9 is a view similar to FIG. 8 depicting the second alterative embodiment of the flux gate in the closed position.

FIGS. 8 and 9 depict a second alterative arrangement for the motor 50. In this alterative arrangement, a flux gate actuation device 120 includes a rotational driver 122 and a rotational flux gate 124. The rotational flux gate 124 is essentially a cylinder which includes a ferromagnetic flux permeable element 126. The rotational flux gate 124 is designed to rotate about an axis and the ferromagnetic flux permeable element 126 has the shape of an elongated segment of a hollow cylinder, and is contained on the rotational flux gate 124 within one hemisphere. Thus, when the rotational flux gate 124 is rotated one hundred eighty degrees into the open position as depicted in FIG. 8, the flux permeable element 126 is spaced apart from the stator core elements 80. During motor operation, the rotational flux gate 124 is rotated back to the zero position such that ferromagnetic flux permeable element 126 forms a continuous magnetic circuit with the stator core elements 80. It will be appreciated that this alternative design will have an space cross section matching the cross sectional shape of the flux permeable element 126.

Within any of the embodiments of FIGS. 3 through 9, the solenoid coils 94 or the actuation device 122 may be energized by current delivered to a commutation device 130 (FIG. 3) for the motor. Thereby, when the motor is commanded to rotate, current which is to be commutated into one of the sets of stator windings initially flows through the solenoid coils 94 (for example) so as to energize the coil 94 and cause the solenoid 92 to insert the flux gate 90 (or 91) into the space 88, thereby completing the magnetic circuit for the motor 50. Conversely, when the motor is not energized, power to the solenoid 92 is shut off, and the spring 98 pulls the flux gates 90 out of the air gaps 88.

Figure 10:
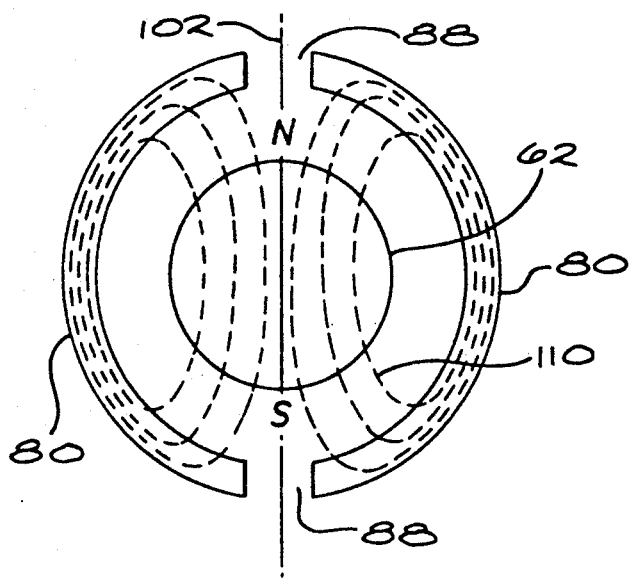
FIGS. 10-12 are simplified views showing only the stator core elements and the permanent magnet rotor and associated magnetic flux field and magnetic circuit of the motor of FIGS. 1-9.
Figure 11:
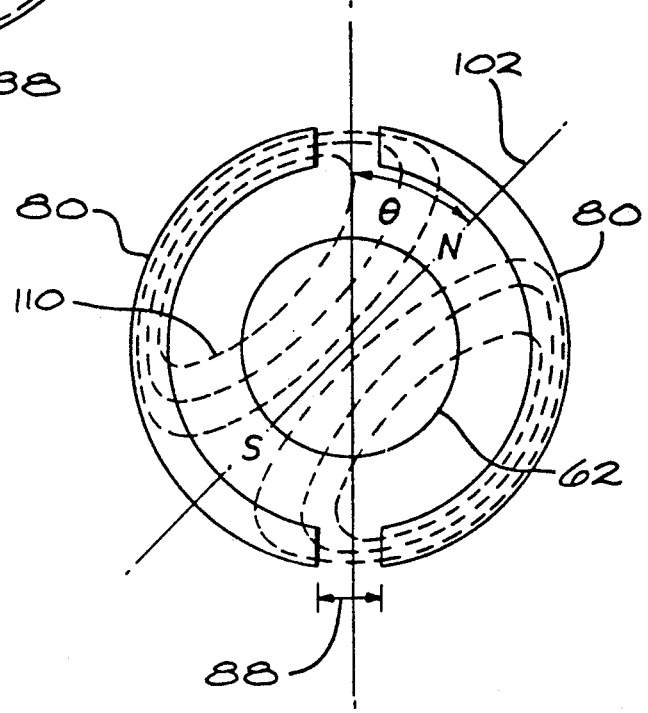
Figure 12:
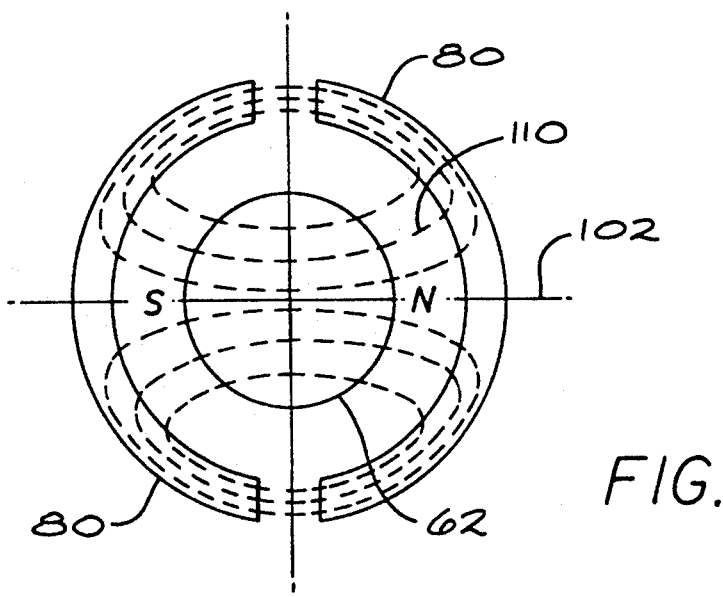

The operation of the brake or detent feature of the invention is most readily understood with reference to FIGS. 10-12, wherein only the permanent magnet rotor 62, and the two stator core elements 80, are depicted. The magnetic flux surrounding the permanent magnet rotor 62 is depicted by magnetic field lines 110. The stator core elements 80 act as a magnetically easy flow path for the magnetic flux, compressing the magnetic field surrounding the permanent magnet rotor 62. In FIG. 10 the magnetic axis is aligned with the space 88 and the permanent magnet rotor 62 is thus in a preferred zero torque location with no flux leakage between the ends of stator core elements 80. However, if the permanent magnet rotor 62 is rotated with respect to the stator core elements 80, there will be a distortion of the magnetic field, leakage across the ends of stator core elements 80, and a resistance to the rotation.

FIG. 11 shows the effect on the magnetic field which results from rotating permanent magnet rotor 62 approximately forty-five degrees with respect to the spaces 88. In this orientation, a significant amount of the magnetic flux is forced to leak across the spaces 88 between the ends of stator core elements 80. Additionally, the flux passing through the permanent magnet rotor 62 has been decreased due to the change in the magnetic circuit reluctance. This change in flux is resisted by the permanent magnet rotor 62, and requires work input into the motor 50.

FIG. 12 shows the unstable zero torque position where the permanent magnet rotor 62 has been rotated exactly ninety degrees from the space 88. In this orientation, all of the decreased magnetic flux is forced to leak across the spaces 88, and the relative attraction to realignment of the magnetic axis with the spaces 88 is equalized in the clockwise and counter clockwise directions. Thus, at the ninety degree position, zero torque is exerted upon the permanent magnet rotor 62 and stator core elements 80, and the permanent magnet rotor 62 is at an unstable position. When the orientation of the magnetic axis deviates from the 90 degree position, the permanent magnet rotor 62 will prefer to continue rotation in the same direction in order to realign with the spaces 88.

For stator core elements 80 formed of a ferromagnetic material with any given properties, maximum torque will be realized from a magnet of any given diameter and length when the maximum radial thickness (Rm) of the stator core elements 80 is determined by the equation:

$$Rm = Rmag*(Bmag/Bpole)$$

and the radial thickness (R) of the stator core elements 80 varies according to the equation:

$$Rm = Rm* \cos\theta$$

where: Rmag is the radius of the permanent magnet rotor 62; Bmag is the flux density in the magnet at the minimum reluctance position; Bpole is the optimum maximum density in flux pole iron at the minimum reluctance position, (about 90K L/sq. in. for silicon steel); and $\theta$ is the angular deviation from Rm. Thus it may be appreciated that the optimum cross sectional design for the stator core elements 80 is generally a crescent shape. However, since this is impractical for motor operation, the preferred shape is at best approximated by the design of the flux gates 90 in FIGS. 4-7 above.

Furthermore, the torque developed in a reluctance coupling is given by the equation:

$$T = dE/d\theta * K$$

wherein E is the magnetic co-energy of the system; $\theta$ is the angular displacement of the permanent magnet rotor 62; and K is a constant. The maximum change in the magnetic co-energy (E) for an ideal coupling is a function of the change in magnetic flux density for a ninety degree displacement and zero pole leakage. In practice, the ideal is not realizable due to the flux leakage existing between the two stator core elements 80. Although leakage can be reduced by reducing flux pole dimension Rm, the higher saturation which occurs at the minimum reluctance position is counter productive. It may be appreciated that at the minimum reluctance position and with negligible iron saturation, flux density in the magnet is uniform regardless of the ratio between the width of space 88 to the diameter of the permanent magnet rotor 62 (Rmag), and that the density in the space varies sinusoidally, being maximum in the direction of magnetization of the permanent magnet rotor 62.

The teachings of the present invention are obviously useful for machines of different sizes, power capability, and structure as will be appreciated by those skilled in the art. In particular, while the two pole permanent magnet rotor and toothless stator motor construction is preferred, it will be appreciated that conventional motors could be adapted by the teachings herein. Accordingly, it is expected that the scope of the invention will be defined only by the appended claims.

I claim:

1. A dynamoelectric machine comprising:
   rotor means for providing a magnetic field;
   stator means for interacting with said magnetic field of said rotor means;
   stator core means mounted about said stator means for providing a continuous magnetic circuit for said magnetic field provided by said rotor means; said stator core means including at least one stator core element about said stator means, said at least one stator core element traversing a total arcuate distance less than 360 degrees about said stator means thereby leaving at least one circumferential space; and at least one flux gate, said at least one flux gate including a ferromagnetic portion configured to traverse said circumferential space defined by said at least one stator core element, and said at least one flux gate translatable with respect to said at least one stator core element and said rotor means and detent means for changing continuity of said magnetic circuit of said stator core means by forming at least one space in said stator core means.

2. The dynamoelectric machine of claim 1, wherein said rotor means comprises a solid cylinder permanent magnet mounted within a high strength non-magnetic retaining sleeve, said permanent magnet magnetized along a diameter forming a two-pole rotor, and said stator means further comprises a cylindrical winding support structure having a plurality of radially outwardly extending, axially aligned fins defining therebetween a plurality of slots, and at least one stator winding disposed about said winding support structure and having conductor portions lying in said slots.

3. The dynamoelectric machine of claim 1, wherein said detent means comprises:

actuating means for translating said ferromagnetic portion of said at least one flux gate in and out of said circumferential space.

4. The dynamoelectric machine of claim 3, wherein said actuating means is a solenoid.

5. A dynamoelectric machine comprising:
a rotor providing a magnetic field;
a stator in magnetic communication with said rotor including a stator core for providing a magnetic circuit for said magnetic field of said rotor; and
detent means for changing continuity of said magnetic circuit of said stator core, said detent means comprising;
at least one flux gate including a ferromagnetic portion of said stator core, and said flux gate being moveable with respect to said stator core; and
actuating means for moving said flux gate so as to form at least one space in said stator core.

6. The dynamoelectric machine of claim 5, wherein said actuating means is a solenoid.

7. The dynamoelectric machine of claim 6, wherein said at least one flux gate further comprises:
an elongated bar having a cross sectional shape matching said space in said stator core, whereby said stator core and said flux gate combine to define a hollow cylinder disposed about said stator.

8. The dynamoelectric machine of claim 7, wherein said flux gate has a generally "V" cross sectional shape and said solenoid is disposed to translate said flux gate radially outward.

9. The dynamoelectric machine of claim 7, wherein said flux gate has a generally right triangle cross sectional shape and said solenoid is disposed to translate said flux gate generally tangentially to a radius of said machine.

10. The dynamoelectric machine of claim 6, wherein said flux gate has a part cylindrical cross sectional shaped ferromagnetic element mounted in a cylindrical member, said cylindrical member independently rotatable about an axis thereof to rotationally displace said ferromagnetic element into and out of said space in response to said actuating means.

11. A dynamoelectric machines comprising:
rotor means for providing a magnetic field;
a shaft attached to said rotor means;
stator means mounted about said rotor means for receiving electrical power and generating a rotating magnetic field to interact with said magnetic field of said rotor means;
stator core means mounted about said stator means and said rotor means for providing a magnetic circuit linkage for said magnetic field provided by said rotor means, said stator core means including at least one stator core element mounted about said stator means, said at least one stator core element traversing a total arcuate distance less than 360 degrees about said stator means thereby leaving at least one circumferential space, said stator core means also including at least one flux gate, said at least one flux gate having a ferromagnetic portion configured to in a first position traverse said circumferential space defined by said at least one stator core element, and said at least one flux gate translatable with respect to said at least one stator core element and said rotor means to a second position not traversing said circumferential space; and
actuating means for translating the position of said at least one flux gate with respect to said rotor between said first and said second positions.

12. An actuating system for alternately rotationally driving and fixedly holding a flight control surface on an aircraft, comprising:
a motor having a rotor generating a magnetic field, a stator mounted about said rotor to receive electrical power and generate a rotating magnetic field to interact with said magnetic field of said rotor, and a stator core mounted about said stator and said rotor to provide a magnetic circuit for said magnetic field provided by said rotor;
at least one flux gate in said stator core, said flux gate including a ferromagnetic portion configured to traverse a circumferential space in said stator core, said at least one flux gate translatable with respect to said stator core and said rotor;
solenoid means attached to said flux gate for interrupting the said magnetic circuit of said stator core by displacing said flux gate from said space when said stator is not energized;
shaft means attached to said rotor and rotationally driven thereby; and
a plurality of actuators attached to said aircraft and said flight control surface, said actuators driven by said shaft means.

13. A stator for an electrical machine comprising:
windings disposed about a winding support structure;
a plurality of generally part-cylindrical stator core elements made of ferromagnetic material and mounted about said windings, each of said stator core elements partially extending around said windings such that a plurality of spaces are located between said stator core elements; and
a plurality of flux gate members made of ferromagnetic material, said flux gate members being moveable to substantially fill said spaces to provide a continuous magnetic flux return path.

14. A stator core for a stator of an electrical machine comprising:

a plurality of stator core elements made of ferromagnetic material, each of said stator core elements partially extending around said stator such that a plurality of spaces are located between said stator core elements; and a plurality of flux gate members made of ferromagnetic material, said flux gate members being moveable to substantially fill said spaces to provide a continuous magnetic flux return path.

* * * * *